United States Patent Office 3,119,658
Patented Jan. 28, 1964

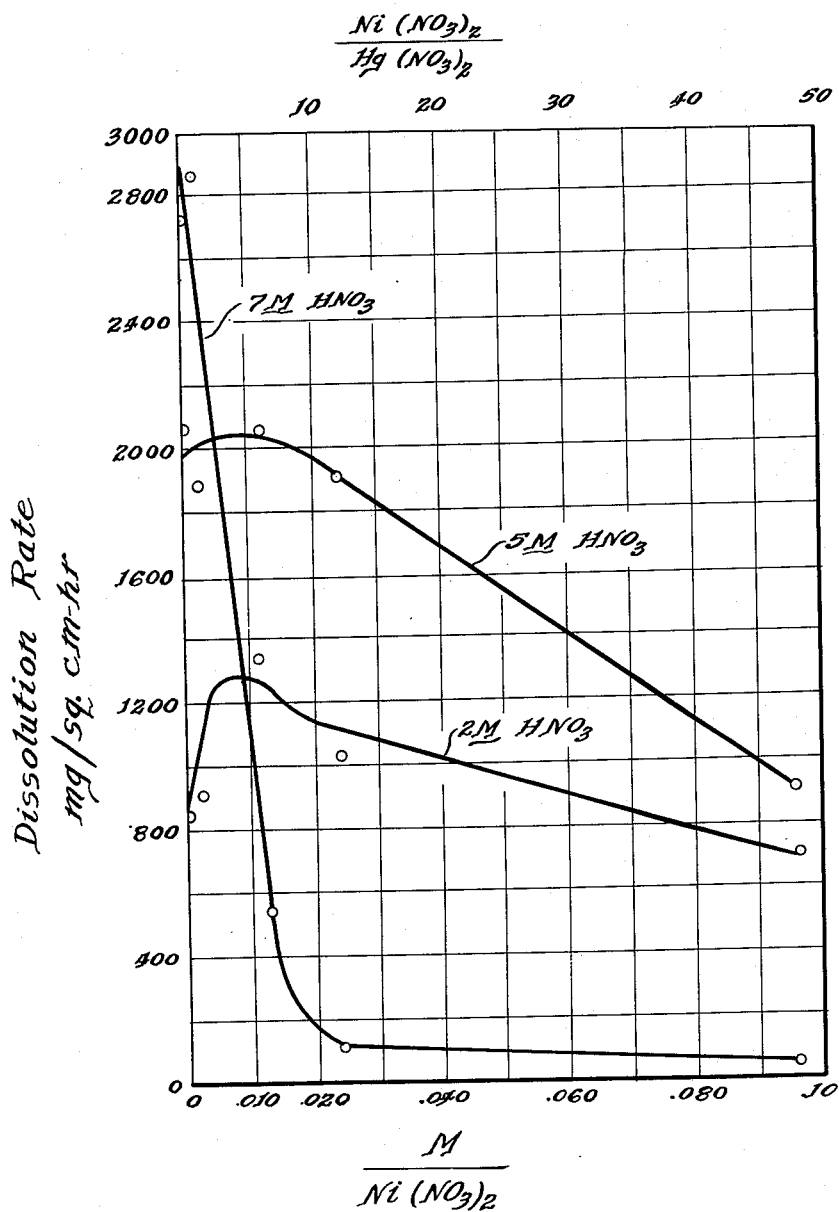

3,119,658
ALUMINUM CLADDING DISSOLUTION
Wallace W. Schulz, Richland, Wash., assignor to the United States of America as represented by the United States Atomic Energy Commission
Filed Dec. 28, 1960, Ser. No. 79,093
4 Claims. (Cl. 23—102)

The invention relates to an improved method of dissolution of the aluminum cladding of nuclear reactor fuel elements and other nuclear reactor components, more particularly to a method of controlling the rate of such dissolution so as to avoid the overtaxing of off-gas handling facilities of fuel reprocessing plants.

Fuel elements in nuclear reactors become unusable, not so much on account of actual depletion of the fissionable fuel values, but because the accumulation within the element of fission products with large neutron absorption cross-sections becomes great enough to interfere with the neutron flux within the reactor, and the element has to be withdrawn if the nuclear reaction is to continue. Since this withdrawal becomes necessary long before the fuel values are anywhere near to being completely consumed, recovery of those remaining has to be made if the reactor is to be operated with any view to economic success. At the same time it is desirable to recover the valuable by-products of reactor operation, the transmutation products such as plutonium, which is a fissionable fuel, and certain of the fission products which are useful for such purposes as pipeline leak testing, metal thickness gauging, and in chemical, biological, and medical research.

Due to its comparatively low neutron absorption cross-section and its good physical and chemical properties, aluminum is widely used as a fuel element cladding material in many present-day nuclear reactors. The pure aluminum of commerce, which is known as 2S or 1100 aluminum, is most frequently used as the main cladding material, and aluminum alloys with silicon are used to bond the cladding to the uranium cores, to solder end caps, and in other places where a lower melting alloy is desirable.

My invention is directed to an improved method of dissolving any of the aluminum cladding and soldering materials of the general class mentioned, and also other aluminum components of nuclear reactors such as the cladding on blanket elements which are much the same structurally as fuel elements but contain fertile rather than fissile materials. The invention may be used whether the fuel or blanket elements are of the metallic type, the ceramic type, or the various mixed types, such as those where uranium oxide is dispersed within a metal matrix. Hereinafter whenever the term fuel element is used, it should be taken to include blanket elements, or any other components of a reactor the dissolution of which is desirable in connection with fuel reprocessing.

The most widely used first step in fuel reprocessing at the present time is the dissolution of the fuel elements, or blanket elements as the case may be, in aqueous nitric acid. It is no longer necessary to dissolve the aluminum cladding separately since it has been discovered that if a mercury catalyst is added, the nitric acid will dissolve the aluminum cladding, as well as the core. Both uranium metal and uranium dioxide dissolve in nitric acid if the concentration is sufficiently great; oxide fuel elements require an acid with a normality of around 7 along with boiling to bring the reaction to completion. In any case, with the mercury catalyst, aluminum-clad fuel elements may be dissolved in a single step, instead of in two steps which were formerly necessary due to the inertness of aluminum to uncatalyzed nitric acid. As will be seen my invention is most effective when the acid normality, or molarity, is in the range of about 5 to about 7, although it does have some effect at lower acidities as will be explained.

One of the principal difficulties experienced with the nitric acid dissolution of aluminum-clad fuel elements is a copious evolution of gases that accompanies it. The gases evolved include the oxides of nitrogen, the volatile fission product gases, such as xenon and iodine vapor, and hydrogen which, at the high temperatures employed, is believed to be a major, and in many cases the major component. The presence of hydrogen creates a danger of explosion, and to offset this a large volume of air is added. This, while effective in removing the explosion hazard, adds greatly to the volume of mixed gases that must be handled in the off-gas facility where the radio-active fission product gases are removed before release is made to the atmosphere. Even in those cases where hydrogen presents no problem such as, for example, where the fuel is of the oxide type and oxidizes any evolved hydrogen or where the nitric acid is strong enough to do this, the off-gas facilities may become overtaxed if the dissolution reaction proceeds so rapidly that the radioactive fission product gases are produced too rapidly to be handled. In either of these cases, an emergency situation can arise unless some means can be found for reducing the evolution of gases by moderating the reaction.

In ordinary chemical processes, dissolving operations may be made to go smoothly by bringing the reactants together slowly, as, for example, by comminuting any solid reactant and introducing it into the reaction vessel in a stream like a liquid. This is not practical in fuel reprocessing because the dangerously radioactive character of the spent fuel elements makes any kind of grinding too dangerous, and they have to be introduced into the dissolver whole, or in large segments. Furthermore, fuel reprocessing operations, because of the radioactivity, have to be carried out by remote control behind heavy shielding, and therefore the number of operations must be kept to a minimum for reasons of both safety and economy. Cooling has been suggested as another means of moderating the dissolution reaction, but this involves the placing of complicated equipment behind the shielding, and further is not entirely effective since the dissolution reaction of the whole fuel element is spasmodic in nature and generates unpredictable amounts of heat.

It is, therefore, the object of the invention to provide an improved method for dissolving aluminum-clad fuel elements and other reactor components in which the rate of the dissolving reaction may be controlled.

It is a more particular object to provide a method for controlling the rate of such reactions so as to avoid overtaxing of the off-gas handling facilities of fuel reprocessing plants.

It is a more particular object of the invention to do this in a simple, safe, and economical manner.

All the foregoing objects are attained by my discovery that the reaction between aluminum and nitric acid, catalyzed by mercury, may be controlled by adding small amounts of nickelous nitrate, or nickel II ion. Several explanations have been advanced to explain the controlling action by this substance, but since none of them have been proved, it would serve no purpose to set them forth at present, and my invention is offered on this basis of my empirical findings that nickelous nitrate has this effect on the reaction in question. Experiments I have made, which will be described in more detail later herein, establish the fact that this substance acts as a kind of anti-synergistic agent, or negative promoter, for the mercury catalyst and, depending on the amount which is added, reduces the rate of the reaction by the catalyst to the degree desired without adversely affecting the overall equilibrium constant of the reaction.

In carrying out the dissolution, the mercury catalyst is usually added in the form of mercuric nitrate in a concentration of about 0.001 M when 7 M nitric acid is used to about 0.005 M when 5 M nitric acid is used. Mercuric sulfate, mercuric oxide, or even metallic mercury can also be used. Lower molarities of nitric acid than 5 are not useful in dissolving fuel elements since they do not dissolve core materials and so lie out of the practical scope of the invention; as a matter of theoretical interest, however, aluminum alone will dissolve in more dilute acid, and at such dilutions, the effect of my anti-synergistic agent becomes less pronounced, and even exerts an opposite effect in 2 M acid when added in small amounts. However, even at this acidiy, if sufficient anti-synergistic agent is added the dissolution action will be moderated to some extent, as will become apparent. My anti-synergistic agent may be any nickelous, or nickel II compound, so long at it does not interfere with the reaction or have some undersirable side effect. Nickelous sulfate, oxide, nitrate, chloride and the like can be used. However, since nitrate anions will greatly predominate in the dissolving solution, the anti-synergistic effect of whatever salt of nickel that is added will be practically the same as if nickelous nitrate had been added but with some risk of a side reaction if a foreign anion is introduced, and therefore nickelous nitrate is preferred.

Table I is now offered and FIGURE 1 containing a graph in which the data from Table I is plotted; this data is based upon experiments in which discs of 1100 aluminum were mounted in Teflon holders so as to expose only one face with a surface area of 6.74 square centimeters and immersed in boiling nitric acid solutions of different acid molarities indicated in the left-hand column. All solutions had a mercuric nitrate molarity of 0.002; the nickelous nitrate molarity of the individual solution is indicated in the second column from the left. The immersion times and the dissolution rates of the individual discs in milligrams per square centimeter per hour appear in the other two columns as indicated. FIGURE 1 has as ordinates the various rates of dissolution found in the experiment, and two sets of equivalent abscissae: those on the left are the molarities of the nickelous nitrate anti-synergistic agent of the various solutions, and those on the right the ratio of these molarities to the 0.002 mercuric nitrate molarity common to all the solutions. As can be seen, these curves strongly indicate the existence of three separate curves for each of the nitric acid molarities, and they are designated accordingly as 2 M, 5 M and 7 M $HNO_3$.

TABLE I

| Solution Composition | | Immersion Time, hrs. | Dissolution Rate, mg./ sq. cm.-hr. |
|---|---|---|---|
| $HNO_3$, M | $Ni(NO_3)_2$, M | | |
| 7.0 | 0.0000 | 0.00833 | 2,720 |
| 7.0 | 0.0024 | 0.00833 | 2,860 |
| 7.0 | 0.012 | 0.0167 | 527 |
| 7.0 | 0.024 | 0.0250 | 67 |
| 7.0 | 0.096 | 0.0333 | 55 |
| 5.0 | 0.0000 | 0.00833 | 2,050 |
| 5.0 | 0.0024 | 0.00833 | 1,880 |
| 5.0 | 0.012 | 0.0167 | 2,150 |
| 5.0 | 0.024 | 0.0250 | 1,910 |
| 5.0 | 0.096 | 0.0333 | 860 |
| 2.0 | 0.0000 | 0.00833 | 840 |
| 2.0 | 0.0024 | 0.00833 | 910 |
| 2.0 | 0.012 | 0.0167 | 1,340 |
| 2.0 | 0.024 | 0.0250 | 1,030 |
| 2.0 | 0.096 | 0.0333 | 660 |

An examination of FIGURE 1 brings out a surprisingly different configuration for the curve of 7 M $HNO_3$ from that of the other two curves. It can readily be seen that by adding a little as 0.005 nickelous nitrate a substantial reduction in the reaction rate results, and when 0.024 M nickelous nitrate (or a ratio of 12 to the 0.002 concentration of mercuric catalyst) is added the reaction rate at 7 M acidity almost reaches its minimum. Thereafter, the 7 M $HNO_3$ curve takes on what appears to be an asymptotic character so that all nickelous additions in excess of 0.24 M yield but very little additional anti-synergistic effect. Reduction continues until about 0.096 M is added, or in other words, throughout the range about 0.005 M to 0.096 M, which is equivalent to a ratio range of 2½ to 48. Since, as a general rule, it is desirable to add as little as possible to reprocessing solutions in order to minimize the bulk of radioactive wastes to be stored, it is definitely advantageous that only such a comparatively small amount of synergist is necessary to reduce the reaction rate as shown by this curve.

In the case of the 5 M $HNO_3$ curve it is apparent that no reduction of reactivity takes place until after about 0.012 M $Ni(NO_3)_2$ has been added, so as to make the molar ratio to the 0.002 M $Hg(NO_3)_2$ about 6. Thereafter, however, a substantial reduction of reactivity takes place, although, of course, far less pronounced than in the case of the 7 M $HNO_3$ curve.

The curve of 2 M $HNO_3$ illustrates the invention in a region where the effectiveness of the nickelous anti-synergist is far less pronounced. This curve shows a definite reverse character, and not until about 0.074 M nickelous nitrate has been added, making the molar ratio with 0.002 M mercuric nitrate about 38, is this reverse effect overcome. Thereafter, however, a gradual, but definite reduction in reactivity takes place, so that it can be said that the method of the invention again becomes operative at larger concentrations.

Further evidence of the inhibiting action of small concentrations of nickel (II) ion on the dissolution of aluminum in $HNO_3$—$Hg(NO_3)_2$ solutions is presented in Table II. In these experiments, aluminum metal discs of comparable surface area and weight were completely dissolved in boiling solutions containing varying concentrations of nitric acid, mercuric nitrate, and nickel nitrate. Large (700 ml.) volumes of solution were used to minimize changes in solution composition. Under these conditions, total dissolution times may be compared and used to estimate the inhibiting effect of various nickel (II) ion concentrations. Conclusions derived from comparison of the total dissolution times listed in Table II are in agreement with those discussed previously as regards the inhibiting action of nickel (II) ion at various acidities.

One further experiment dramatically demonstrated the inhibiting effect of nickel (II) ion. In this case, a four-gram aluminum metal disc was immersed in 700 ml. of boiling 7.0 M $HNO_3$—0.002 M $Hg(NO_3)_2$ solution. Dissolution at a rapid rate was allowed to proceed for two minutes. Addition of sufficient solid $Ni(NO_3)_2.6H_2O$ to make the solution 0.096 M in nickel (II) quenched the vigorous reaction immediately.

TABLE II

*Total Dissolution of Aluminum Metal Discs in $HNO_3$—$Hg(NO_3)_2$—$Ni(NO_3)_2$ Solutions*

[Conditions: Aluminum metal disc (1.08 in. diameter 0.125 in. thick) of weight indicated completely dissolved in 700 ml. of boiling solution of indicated initial compositon. All solutons were 0.002 M $Hg(NO_3)_2$]

| Solution Composition | | Weight disc, grams | Time for Complete dissolution, minutes |
|---|---|---|---|
| $HNO_3$, M | $Ni(NO_3)_2$, M | | |
| 7.0 | 0.000 | 4.4642 | 8 |
| 7.0 | 0.012 | 4.4646 | 27 |
| 7.0 | 0.024 | 4.4627 | 83 |
| 7.0 | 0.096 | 4.4670 | 400 |
| 5.0 | 0.000 | 4.4756 | 12 |
| 5.0 | 0.096 | 4.4615 | 38 |
| 2.0 | 0.000 | 4.4701 | 35 |
| 2.0 | 0.096 | 4.4713 | 90 |

EXAMPLE

A spent nuclear reactor fuel element consisting of a natural uranium core, with fission and transmutation products, and 2S aluminum cladding is dissolved in 7 M aqueous nitric acid with a 0.002 M mercuric nitrate catalyst. As the reaction becomes extremely vigorous and gas evolution causes spraying upward from the reaction vessel, 0.024 M nickelous nitrate is added and within a few seconds the gas evolution becomes orderly and spraying ceases. Thereafter the reaction visibly continues with small fine bubbles breaking through the surface of the acid solution in a steady manner until the fuel element completely dissolves and a clear solution appears.

It will be understood that this invention is not to be limited to the details given herein, but that it may be modified within the scope of the appended claims.

What is claimed is:

1. A method of dissolving aluminum comprising immersing it in 2 to 7 M nitric acid and adding 0.001 to 0.01 M mercuric nitrate as a catalyst and, as an antisynergistic agent, nickelous nitrate in a molar ratio to the mercuric nitrate of above about 2½.

2. The method of claim 1 where the nitric acid is about 7 M, the mercury catalyst is about 0.002 M mercuric nitrate and the nickelous nitrate is from about 0.005 M to 0.024 M.

3. The method of claim 2 where the nickelous nitrate is about 0.024 M.

4. A negatively promoted mercury catalyst for the dissolution of aluminum in nitric acid, consisting essentially of nickelous nitrate and mercuric nitrate having a molar ratio between nickelous nitrate and mercuric nitrate of 2½ to 48.

References Cited in the file of this patent

UNITED STATES PATENTS

| 2,698,305 | Plank et al. | Dec. 28, 1954 |
| 2,737,445 | Nossen | Mar. 6, 1956 |
| 2,891,840 | Curtis | June 23, 1959 |
| 2,901,343 | Peterson | Aug. 23, 1959 |
| 2,943,987 | Anderson | July 5, 1960 |

FOREIGN PATENTS

| 590,381 | Great Britain | July 16, 1947 |

OTHER REFERENCES

Reactor Handbook, 2nd Edition, pp. 550–553 (1961). Copy in Patent Office Scientific Library.